United States Patent

[11] 3,603,741

[72] Inventor John W. Deed
Garden Grove, Calif.
[21] Appl. No. 801,449
[22] Filed Feb. 24, 1969
[45] Patented Sept. 7, 1971
[73] Assignee Master Specialties Company
Costa Mesa, Calif.

[54] TAPE CARTRIDGE ASSEMBLY HAVING LATCH, PRESSURE ROLLER, TRANSDUCERS AND TERMINALS INCORPORATED THEREIN

3 Claims, 11 Drawing Figs.

[52] U.S. Cl. 179/100.2 Z, 226/194, 242/55.19 A, 242/198, 274/4 B
[51] Int. Cl. G11b 23/06, B65h 17/20
[50] Field of Search 179/100.2 Z; 274/4 B, 4 F; 242/198, 55-79 A, 199, 200; 226/192, 194; 312/320, 333

[56] References Cited
UNITED STATES PATENTS

| | | | |
|---|---|---|---|
| 3,011,851 | 12/1961 | Verga | 312/320 |
| 3,265,817 | 8/1966 | Gilman | 179/100.2 |
| 3,420,461 | 1/1969 | Cousino | 179/100.2 |
| 3,505,486 | 4/1970 | Lear | 179/100.2 |
| 3,285,610 | 11/1966 | Shields | 226/194 |

*Primary Examiner*—Bernard Konick
*Assistant Examiner*—J. Russell Goudeau
*Attorney*—Owen & Owen ABSTRACT: A tape cartridge for an endless magnetic sound-reproducing tape. A record-playback head and an erase head are mounted in the cartridge and are electrically connected to terminals which extend partially along one side and the end of the cartridge. The endless tape extends around a pressure roller assembly which is biased to project from a side of the cartridge for engaging a drive capstan. The pressure roller assembly includes a self-aligning bearing to assure maximum contact with the capstan. Two cartridge holders can be mounted side-by-side to receive two cartridges for simultaneously driving two tapes from opposite sides of the capstan, and a number of the cartridge holders may be stacked for simultaneously driving a number of tapes from the single capstan. Each cartridge holder includes electrical contacts aligned to engage the cartridge terminals and a snap member for holding the cartridge in place. The cartridge further includes a handle to facilitate removal from the cartridge holder.

INVENTOR:
JOHN WILLIAM DEED.
BY
[signature]
ATT'YS.

INVENTOR:
JOHN WILLIAM DEED.
BY
ATT'YS.

INVENTOR:
JOHN WILLIAM DEED.
BY
ATT'YS.

TAPE CARTRIDGE ASSEMBLY HAVING LATCH, PRESSURE ROLLER, TRANSDUCERS AND TERMINALS INCORPORATED THEREIN

BACKGROUND OF THE INVENTION

This invention relates generally to a tape cartridge and a cooperating cartridge holder and, more particularly, to an improved cartridge for endless magnetic sound-reproducing tapes and to an improved holder which permits stacking a plurality of the improved cartridges for simultaneous operation from a single capstan.

A number of different types of magnetic tape cartridges are commercially available. A typical cartridge includes an endless magnetic tape which is stored on a reel and has a loop which extends past a pressure roller assembly for engaging a drive capstan. The cartridge generally has an opening either along one side or on the bottom for receiving the drive capstan and one or more reproducing heads which are mounted on a tape transport.

Present-day tape cartridges work well when used for relatively long recorded messages, for examples, for messages ranging from perhaps one minute to several hours. However, several problems arise when a number of short recorded messages are to be played often and in a random order. Since there is usually only one playback head mounted on the transport, the cartridge must be changed each time the message is changed. There is also a problem in designing the cartridges and the transport to achieve proper alignment of the tape with the reproducing head and, when the pressure roller is mounted in the cartridge, accurate alignment of the pressure roller with the capstan for driving the tape.

A further problem exists in the design of pressure rollers used in conventional cartridges. Since the axes of the pressure roller and the capstan may not be parallel, the pressure roller and capstan may not exert an even pressure on the tape.

SUMMARY OF THE INVENTION

The present invention contemplates an improved endless magnetic tape cartridge which includes at least one reproducing head. Installing the reproducing head(s) inside the cartridge eliminates alignment problems between head and tape common to ordinary tape cartridges. This is especially effective when recording on one head and playing back on a succeeding head. The cartridge design permits miniaturization and the stacking of a number of cartridges in a small space for simultaneous operation from a single capstan. The cartridge of the present invention is particularly suited for use in systems where a number of short messages or warnings are repeatedly played in a random order, for example, in an elevator having a floor annunciator, in an audio-readout device for a digital voltmeter, and in an audio-warning system for aircraft or industry.

The improved tape cartridge includes a flat, elongated housing having an opening on one side. A pressure roller assembly is biased to project through the opening for engaging a tape drive capstan. At least one single track record-playback head is mounted in the cartridge, although an erase head may also be mounted in the cartridge and both heads may be of the double tracked type when two different messages are to be recorded on the tape. The heads are electrically connected to wire terminals which extend along a portion of one side and the back of the cartridge. The endless tape is stored on a conventional tape reel and has a loop which is guided past the heads and around the pressure roller. Pressure pads are mounted to press the tape firmly against the heads.

The pressure roller assembly includes a self-aligning bearing which maintains the roller parallel to the capstan while permitting it to be rotated by the capstan. Since the self-aligning bearing maintains flat contact between the roller and the capstan, an even pressure is exerted on the tape.

The tape cartridges are designed to slide into cooperating cartridge holders. Two cartridge holders may be mounted side-by-side with a motor driven capstan projecting between them. The pressure rollers on two cartridges inserted into the side-by-side holders engage opposite sides of the capstan for simultaneous operation. A number of the holders may be stacked in a small space for simultaneously operating a plurality of tapes from a single capstan. Ten cartridges have, for example, been mounted in a space having dimensions of 1-9/16 inches by 1-9/16 inches by 1-14/16 inches.

The cartridge holders and each cartridge are provided with cooperating snap or clip members for firmly holding the cartridge in the holder with the pressure rollers biased firmly against the drive capstan. A handle is provided at the front of the cartridge to facilitate in removing the cartridge from the holder. The handle is pivoted when the cartridge is removed from the holder. As the handle is pivoted, a lever portion of the handle disengages the snap or clip members which hold the cartridge in the cartridge holder.

Accordingly, it is a primary object of this invention to provide an improved tape cartridge having an endless magnetic tape and at least one record-playback head.

Another object of the invention is to provide an improved tape cartridge which may be stacked with a number of similar cartridges for simultaneous operation from a single capstan.

Still another object of the invention is to provide an improved self-aligning bearing for a pressure roller assembly in a tape cartridge.

A further object of the invention is to provide an improved handle to facilitate in removing a tape cartridge from a cartridge holder.

Other objects and advantages of the invention will become apparent from the following detailed description, reference being made to the accompanying drawings.

DESCRIPTION OF THE PREFERRED EMBODIMENTS

Figures 1, 2, 3, 4:
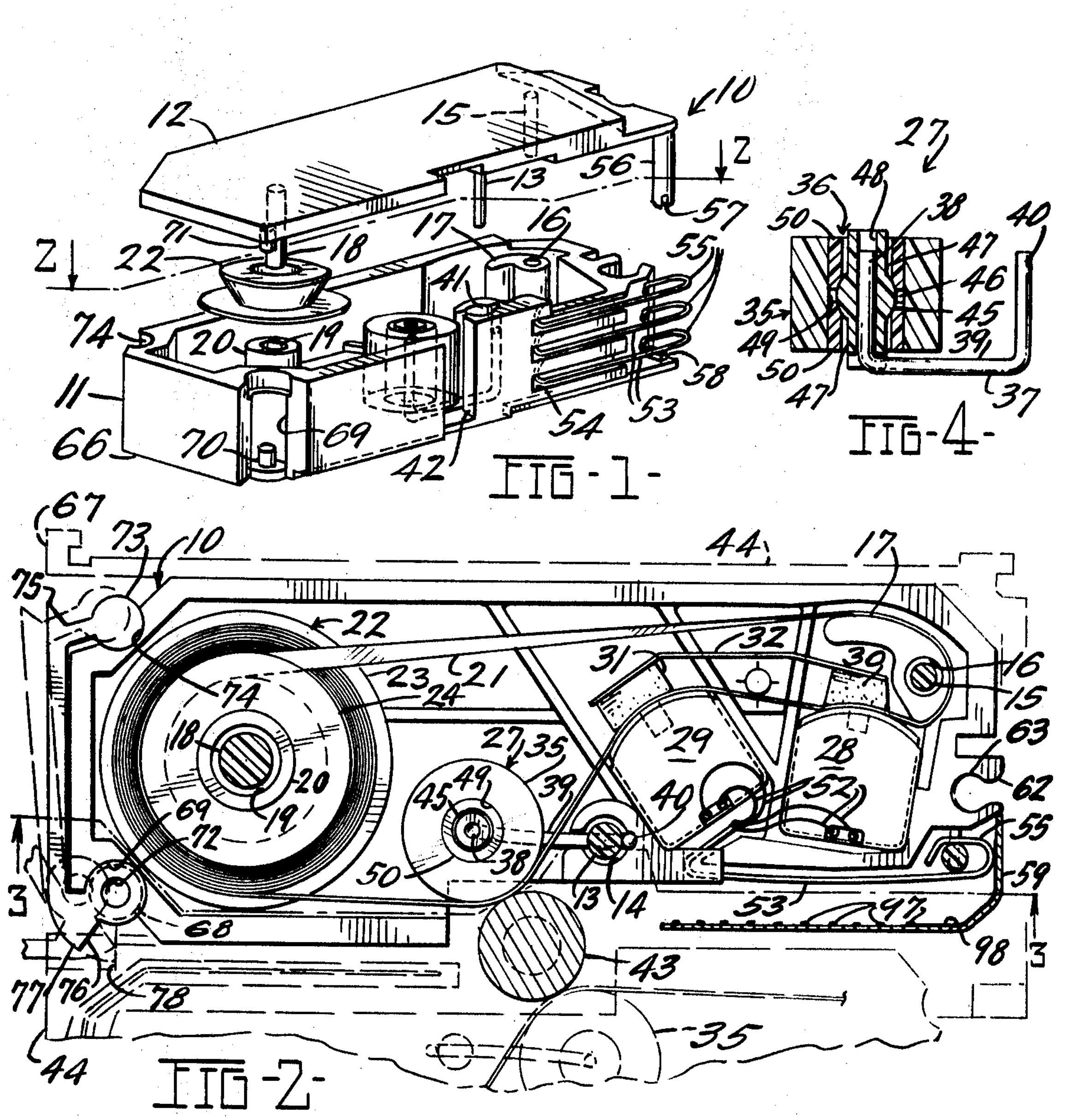
FIG. 1 is an exploded perspective view of a tape cartridge constructed in accordance with the invention, but with the cartridge handle removed.
FIG. 2 is a cross-sectional view of the tape cartridge taken along line 2—2 in FIG. 1.
FIG. 3 is a cross-sectional sectional view of the tape cartridge taken along line 3–2 in FIG. 2.
FIG. 4 is a sectioned view of the pressure roller assembly, showing the self-aligning bearing in detail.
Figure 3:
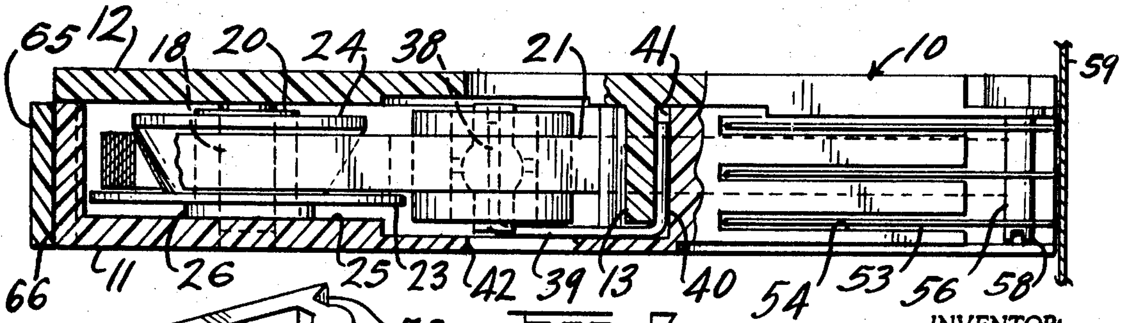

Referring now to FIGS. 1–3, the preferred embodiment of the tape cartridge is shown in detail. The tape cartridge, referred to by the reference 10 generally includes a housing 11 and a cover 12 which are preferably made from a synthetic resinous material. The cover 12 is attached to the housing 11 by three pins, which are integrally formed with the top and are preferably slightly tapered. One pin 13 fits into a cooperating socket 14 in the housing 11, a second pin 15 fits into a cooperating bore 16 through a tape-guide member 17 which projects upwardly from the bottom of the housing 11, and a third pin 18 fits into a cooperating bore 19 through a spindle 20 which projects upwardly from the bottom of the housing 11. The bores 16 and 19 extend through the housing 11 to permit easy removal of the cover 12 by pushing on the lower ends of the pins 15 and 18. Permanent closure o the cartridge cover may be accomplished by peening the pins 15 and 18 after insertion in the bores 16 and 19, respectively.

An endless magnetic sound-reproducing tape 21 is stored in the housing 11 on a tape reel 22. The tape reel 22 is of a conventional type, having a reel disk 23 and a central hub 24. The tape reel 22 is mounted to rotate freely on the spindle 20 and is spaced above the bottom 25 of the housing 11 by a raised bearing surface 26. Also mounted in the housing 11 are a pressure roller assembly 27 and at least one reproducing head, preferably both an erase head 28 and a record-playback head 29. The heads 28 and 29 may be either single track or dual track. The endless tape 21 has a loop which extends from the tape reel 22 around the tape-guide member 17, past the erase head 28 and the record-playback head 29, around the pressure roller assembly 27, and back to the tape reel 22. A pair of pressure pads 30 and 31 attached to a metal spring 32 press the tape 21 against the erase head 28 and the record-playback head 29, respectively, The spring 32 is rigidly attached to the bottom 25 of the housing 11.

Referring to FIG. 4, the pressure roller assembly 27 generally comprises a cylindrical roller 35, a self-aligning bearing 36 and a U-shaped wire 37. The U-shaped wire 37 has an axle portion 38, a spring portion 39 and a lock portion 40. The cylindrical roller 35 is rotatably mounted by means of the self-aligning bearing 36 on the axle portion 38 of the wire 37. The lock portion 40 of the wire 37 is designed to slide into a groove 41 along one side of the socket 14 in the housing 11 and to be rigidly locked in place by the pin 13 on the cover 12. When the wire 37 is locked in the housing 11, the cylindrical roller 35 projects through an opening 42 near the center of one side of the housing 11 for engaging a drive capstan 43. When the tape cartridge 10 is inserted into a cartridge holder 44 (which will be subsequently discussed in detail), the spring portion 39 of the wire 37 biases the cylindrical roller 35 firmly against the capstan 43, with the tape 21 pinched between the roller 35 and the capstan 43. The self-aligning bearing 36 maintains the cylindrical roller 35 parallel to the capstan 43 while permitting the roller 35 to be driven by the capstan 43. The self-aligning bearing 36 generally comprises a bearing member 45 having a generally spherically shaped central portion 46 and two opposed cylindrically shaped end portions 47. A bore 48 extends through the end portions 47 and the central portion 46 for placement of the axle portion 38 of the U-shaped wire 37. The spherically shaped central portion 46 has a diameter larger than the diameter of the cylindrically shaped end portions 47, but smaller than the diameter of an axial bore 49 through the cylindrical roller 35. A pair of bushings 50 are positioned in the bore 49 to hold the roller 35 into the spherical portion 46. The bushings 50 have an internal diameter lying between the diameters of the end portions 47 and the central portion 46 of the bearing member 45 and have an external diameter of a size to provide an interference fit in the axial bore 49. The internal end of each bushing 50 has a spherical radius matching the central portion 46. This spherical radius rotates on the central portion 46, thereby providing a self-aligning bearing. Thus it will be axial bore 49 through the cylindrical roller 35. A pair of bushings 50 are positioned in the bore 49 to hold the roller 35 onto the spherical portion 46. The bushings 50 have an internal diameter lying between the diameters of the end portions 47 and the central portion 46 of the bearing member 45 and have an external diameter of the size to provide an interference fit in the axial bore 49. The internal end of each bushing 50 has a spherical radius matching the central portion 46. This spherical radius rotates on the central portion 46, thereby providing a self-aligning bearing. Thus it will be seen that the self-aligning bearing 36 will allow the cylindrical roller 35 to rotate freely about an axis which is at a small angle to the axle portion 38 of the U-shaped wire 37.

Referring again to FIGS. 1–3, leads 52 from the erase head 28 and the record-playback head 29 are connected to wire terminals 53. The leads 52 are soldered to one end of the terminals 53, which are preferably plated beryllium copper wire. The terminals 53 lie in grooves 54 spaced along one side of the housing 11. The wire terminals 53 are terminated in loops 55 located at a rear corner of the housing 11. A pin 56 extends from the cover 12 through the loop 55 on each wire terminal 53. A notch 57 formed in the end of the pin 56 locks onto a detent 58 on the housing 11. When the tape cartridge 10 is inserted into the cartridge holder 44, the wire terminals 53 contact a conductor cable 59, as will be subsequently discussed in greater detail.

Figure 5:
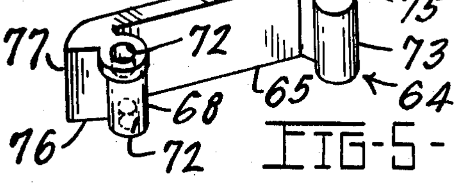
FIG. 5 is a perspective view of a novel tape-cartridge handle constructed in accordance with the instant invention.

Referring now to FIGS. 2 and 5, the cartridge 10 includes snap or clip members 62 for engaging a cooperating detent 63 on the cartridge holder 44 and a handle 64 to facilitate in disengaging the snap members 62 from the detent 63. The snap members 62 on the housing 11 is designed to engage the detent 63 on the holder 44 with sufficient force to prevent the cartridge 10 from being forced from the housing 44 by the force exerted between the roller 35 and the capstan 43 by the spring 39 and from being jarred from the housing 44. If, for example, the tape cartridge 10 is used in an instrument, in a combat helicopter, the tape cartridge 10 may be subject to high shock forces which will tend to jar it from the housing 44.

The handle 64 has a flat body portion 65 which is mounted to lie against the front end 66 of the housing 11, flush with the open end 67 of the cartridge holder 44. The handle 64 has a cylindrical portion 68 adjacent one end which is pivotally received by a cooperating cylindrical groove 69 in the end 66 of the housing 11. A pivot 70 on the housing 11 and pivot 71 on the housing cover 12 engage bores 72 in the ends of the cylindrical portion 68 of the handle 64. When the handle is pivoted to a position such that the flat body portion 65 is against the flat front end 66 of the housing 11, a cylindrical snap portion 73 on the handle 64 engages a cooperating cylindrical socket 74 on the cartridge housing 11, firmly holding the handle 64 in this position. When the cartridge 10 is to be removed from the cartridge holder 44, the operator may insert either his fingernail or a tool under a tapered end portion 75 of the handle 64 for prying the snap 73 from the socket 74. As the end 75 of the handle 64 is swung away from the front end 66 of the housing 11, a cam surface 76 adjacent to the other end 77 of the handle 64 engages a notch 78 in the adjacent cartridge holder 44 By pivoting the handle 64, the cam surface 76 exerts sufficient leverage force on the notch 78 to disengage the snap members 62 on the housing 11 from the detent 63 on the cartridge holder 44. Once the snap members 62 are disengaged from the detent 63, the tape cartridge 10 will readily slide from the cartridge holder 44.

Figures 6, 7, 8:
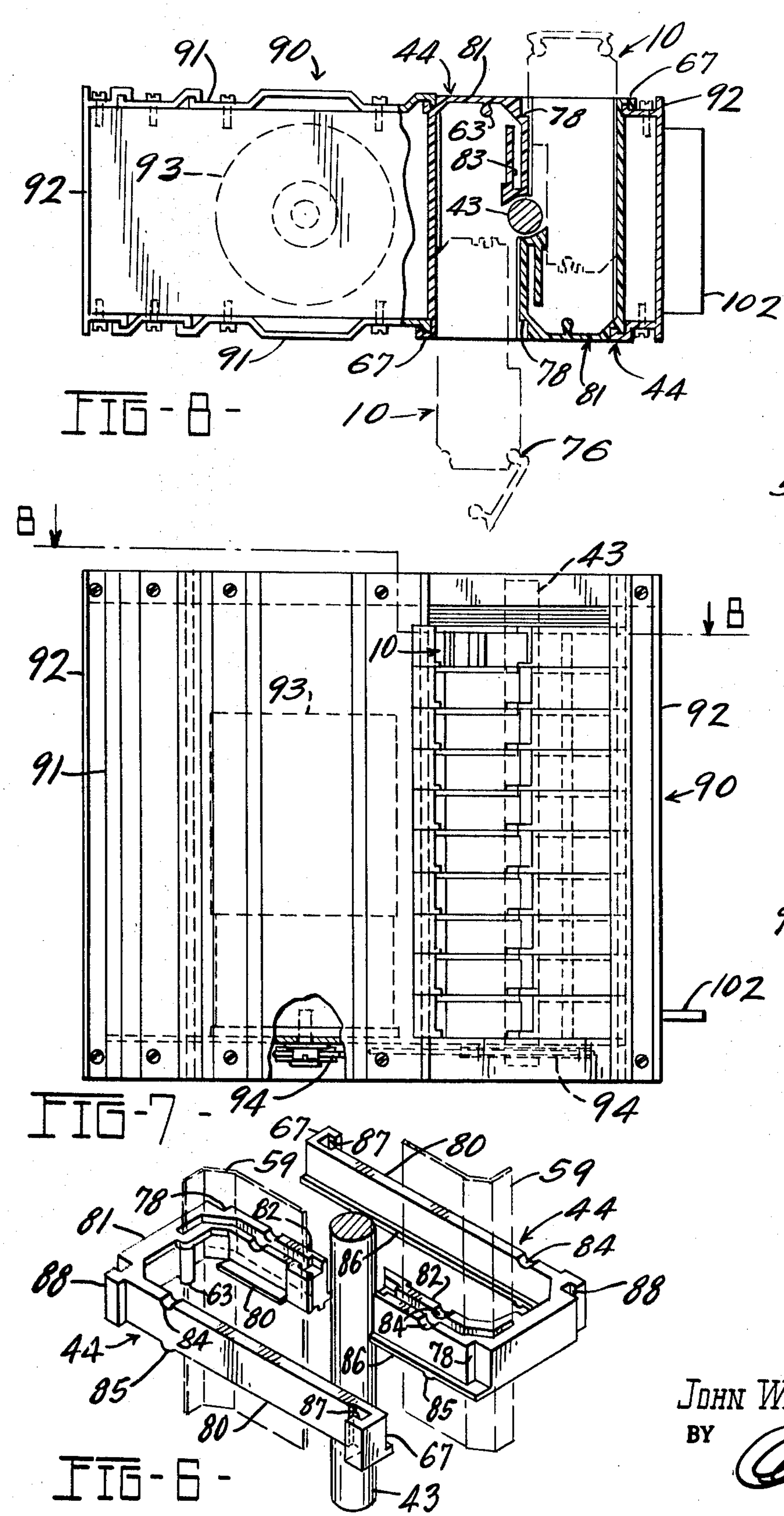
FIG. 6 is a perspective view of two tape cartridge holders mounted in a side-by-side relationship.
FIG. 7 is an elevational view of a tape transport for simultaneously driving 20 tape cartridges.
FIG. 8 is a cross-sectional view of the tape cartridge transport taken along line 8—8 of FIG. 7.

Referring now to FIG. 6, two adjacent tape-cartridge holders 44 are shown positioned on opposite sides of the tape drive capstan 43. Each holder 44 generally comprises an elongated side portion 80, an end portion 81 from which the detent 63 projects, and a short side portion 82 which defines a channel 83 for receiving the conductor cable 59. A number of grooves 84 are formed in the upper edge of the holder 44 and a number of matching tongues 85 are formed to extend from the lower edge of the holder 44. When the holders 44 are stacked, the tongues 85 and grooves 84 maintain the stack in proper alignment. Each holder 44 includes integral rails 86 extending along the elongated side portion 80 and the short side portion 82 for guiding and aligning the tape cartridges 10 as they are inserted into the holders 44. Each holder 44 further includes a groove 87 extending vertically along an edge of the elongated side portion 80 adjacent to the end 67 and a matching tongue 88 extending vertically along an edge of the elongated side portion 80 adjacent the end 81. The grooves 87 and the tongues 88 are used to lock the holder 44 in position on a tape transport and to lock the holders together in pairs when four or more holders are used with two or more capstans.

Referring now to FIGS. 7 and 8, a tape transport 90 for simultaneously driving 20 tape cartridges 10 is shown in detail. The transport 90 has extruded side portions 91 and extruded end portions 92. A motor 93 is mounted within the transport 90 for driving the capstan 43 through a series of speed reducing pulleys 94. Two stacks of ten cartridge holders 44 are mounted on opposite sides of the capstan 43. The grooves 87 and the tongues 88 on one stack of the holders 44 lock onto cooperating tongues and grooves on the extruded transport sides 91 while the grooves 87 and the tongues 88 on the other stack of holders 44 lock onto cooperating tongues and grooves on the end 92 of the transport 90.

Figure 9:
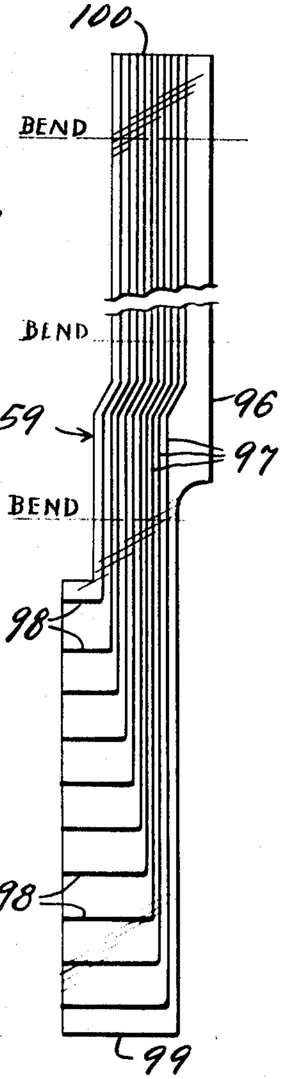
FIG. 9 show the flat, flexible terminal strip used to make electrical connections to reproducing heads in tape cartridges held in the cartridge transport.
Figure 10:
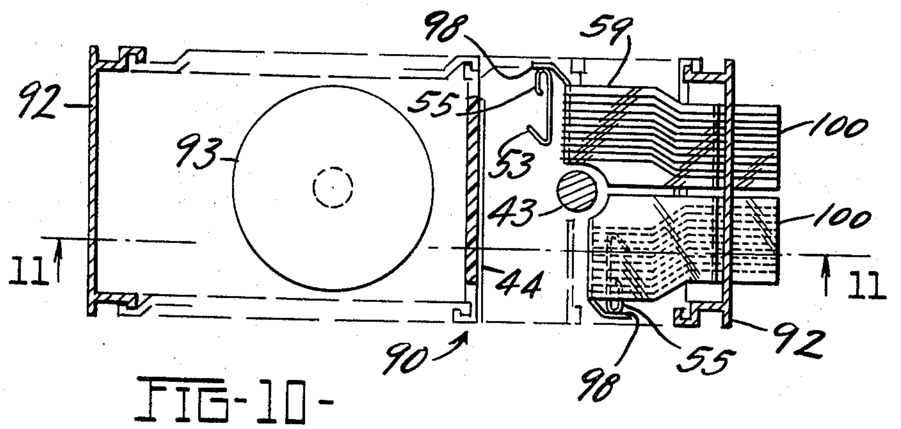
FIG. 10 is a cross-sectional top view of the cartridge transport, showing the position of the electrical terminals.
Figure 11:
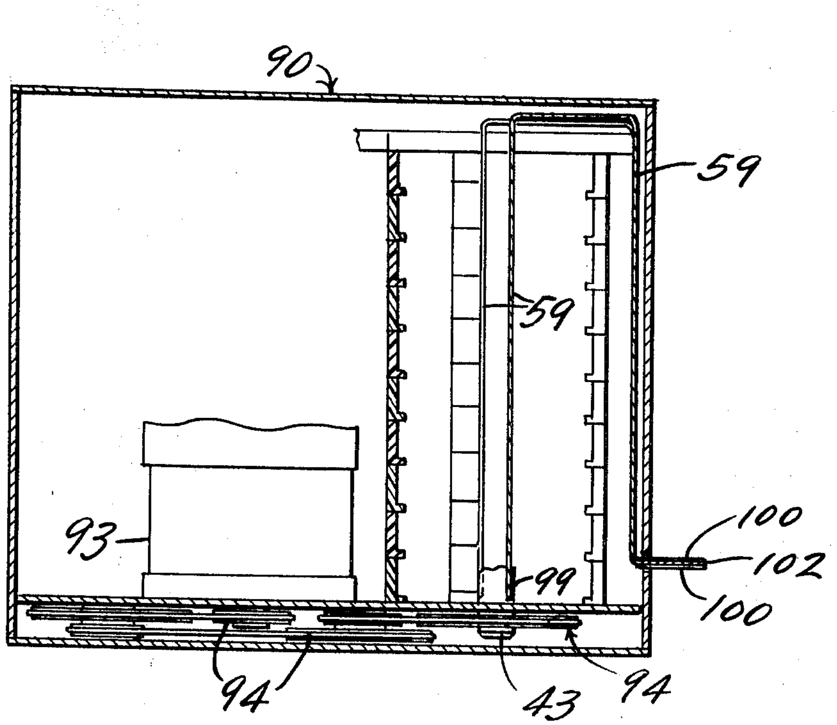
FIG. 11 is a partial cross-sectional view of the tape cartridge transport as taken along line 11—11 in FIG. 10 and further showing the position of the electrical terminals.

Referring now to FIGS. 9–11, the electrical connections for the tape cartridges 10 are shown in detail. A single layer of the conductor cable 59 is shown in detail in FIG. 9. The conductor cable 59 comprises a thin flexible sheet of insulating material 96 having a number of flat copper conductors 97 spaced along one side. The conductors 97 each have a terminal portion 98 which, when the cable 59 is aligned in the vertical channel 83 through the stack of cartridge holders 44, electrically contact the wire terminals 53 on the tape cartridges 10. The conductor cable 59 may be from one to five layers thick, depending upon the number of connections which are to be made with each cartridge 10. In constructing the tape transport 90, the stacks of cartridge holders 44 are glued together and inserted on the sides 91 and the end 92 of the transport 90. One end 99 of the conductor cable 59 is then fed into the channel 83 in the stack of cartridge holders 44. When the end 99 of the cable 59 reaches the bottom of the transport 90, the terminal portions 98 of the cable 59 are aligned with the contacts on the individual cartridges 10 and the cable is cemented in place. The other end 100 of the cable 59 extends through the transport 90 and is laminated to a projecting cable extender 102. The cable extender 102 is adapted to be received by a matching connector for electrically connecting the reproducing heads 28 and 29 in each cartridge 10 with an external amplifier system (not shown).

It will be appreciated that with the instant invention, any number of tape cartridges can be stacked in a small housing for simultaneous operation from either a single capstan or a number of parallel capstans. Various other modifications and changes may be made to the invention without departing from the scope of the appended claims.

What I claim is:

1. A tape cartridge for insertion in a cartridge holder comprising, in combination, a housing having a base, a reel assembly mounted on said base for rotation about an axis normal to said base, at least one reproducing head mounted in said housing and removable therewith from the cartridge holder, at least two terminals attached to said housing for engaging cooperating contacts on the cartridge holder, means electrically connecting said reproducing head to said terminals whereby insertion of said cartridge in the holder establishes electrical connection between said reproducing head and said holder contacts, an angle extending substantially perpendicular to said base, means for biasing said axle towards an opening in one side of said housing, a cylindrical pressure roller having an axial bore extending therethrough, a cylindrical bearing member having a spherically shaped central portion and opposed cylindrical end portions, the diameter of said central portion being larger than the diameter of said end portions and smaller than the diameter of the axial bore through said roller, said cylindrical bearing member further having an axial bore through said end portions and said central portion, two tubular bushings having external diameters lying between the diameter of the axial bore through said roller, said cylindrical bearing member further having an axial bore through said end portions and said central portion, two tubular bushings having external diameters lying between the diameters of said end portions and said central portion and having external diameters for an interference fit in the ends of said axial bore through said roller, said bushings contacting said spherically shaped central portion for holding said bearing member in said bore of said roller, said cylindrical bearing member being positioned on said axle whereby an edge of said pressure roller extends through said opening in said housing for engaging an external drive capstan, and an endless sound reproducing tape stored on said reel assembly and having a loop extending from said reel assembly past said reproducing head and said extended edge of said pressure roller and back to said reel assembly.

2. A tape cartridge for insertion in a cartridge holder comprising, in combination, a housing having a base, snap means on said housing for engaging a cooperating member being operable to frictionally hold said cartridge in the cartridge holder, means for pivotally attaching said handle to said housing, one end of said handle comprising lever means for disengaging said snap means on said housing from the cooperating member on the cartridge holder as said handle is pivoted from a first to a second position, a reel assembly mounted on said base for rotation about an axis normal to said base, at least one reproducing head mounted in said base, at least one reproducing head mounted in said housing and removable therewith from the cartridge holder, at least two terminals attached to said housing for engaging cooperating contacts on the cartridge holder, means electrically connecting said reproducing head to said terminals whereby insertion of said cartridge in said holder establishes electrical connection between said reproducing head and the holder contacts, a pressure roller assembly having a portion extending through an opening in one side of said housing for engaging an external drive capstan, and an endless sound-reproducing tape stored on said reel assembly and having a loop extending from said reel assembly past said reproducing head and said pressure roller and back to said reel assembly.

3. In a tape cartridge having an endless sound reproducing tape, an improved pressure roller assembly mounted on an axle in the cartridge for rotatably engaging a drive capstan comprising, in combination, a bearing member having a spherically shaped central portion and opposed cylindrically shaped end portions, said central portion having a larger diameter than said end portions, said bearing member having an axial bore through said end portions and said central portion for positioning on the axle, a cylindrical roller having an axial bore of a diameter larger than the diameter of said central portion, and means for holding said bearing member in the axial bore through said roller whereby said roller can rotate on said bearing member about an axis at an angle to the axle, said holding means including at least one bushing, said bushing having an internal diameter larger than the diameter of said end portions and smaller than the diameter of said central portion and having an external diameter of a size for an interference fit in an end of the axial bore through said roller.

PO-1050
(5/69)

UNITED STATES PATENT OFFICE
CERTIFICATE OF CORRECTION

Patent No. 3,603,741 Dated September 7, 1971

Inventor(s) John W. Deed

It is certified that error appears in the above-identified patent and that said Letters Patent are hereby corrected as shown below:

Column 2, line 43, the number "3-2" should be "3-3"; and line 54, the word "show" should be "shows".
Column 3, line 49, the word "of", first occurrence, should be "on";
line 54, the word "into" should be "onto"; and
line 63, after the word "bearing." through line 72, delete "Thus it will be axial bore 49 through the cylindrical roller 35. A pair of bushings 50 are positioned in the bore 49 to hold the roller 35 onto the spherical portion 46. The bushings 50 have an internal diameter lying between the diameters of the end portions 47 and the central portion 46 of the bearing member 45 and have an external diameter of the size to provide an interference fit in the axial bore 49. The internal end of each bushing 50 has a spherical radius matching the central portion 46. This spherical radius rotates on the central portion 46, thereby providing a self-aligning bearing.".
Column 4, line 47, after the reference number "44", insert a period (.).
Column 5, line 55, (claim 1), the word "angle" should be "axle".
Column 6, line 22, (claim 2), after the word "member" insert -- on the cartridge holder, said snap means and the cooperating member --;
line 24, (claim 2), after the word "holder," insert -- a handle for removing said cartridge from the cartridge holder, --;
line 30, (claim 2), after the word "said" delete "base, at least one reproduc-"; and
line 31, (claim 2), delete "ing head mounted in said".

Signed and sealed this 28th day of March 1972.

(SEAL)
Attest:

EDWARD M.FLETCHER,JR.
Attesting Officer

ROBERT GOTTSCHALK
Commissioner of Patents